(12) United States Patent
Westphal (10) Patent No.: US 9,009,291 B2
(45) Date of Patent: Apr. 14, 2015

(54) SYSTEM AND METHOD FOR DIRECTING ATTENTION TO WEB SITE FUNCTIONALITY

(75) Inventor: Geoffry A. Westphal, Park Ridge, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 2377 days.

(21) Appl. No.: 11/432,948

(22) Filed: May 12, 2006

(65) Prior Publication Data

US 2007/0266146 A1  Nov. 15, 2007

(51) Int. Cl.
*G06F 15/173* (2006.01)
*G06F 17/30* (2006.01)

(52) U.S. Cl.
CPC .............................. *G06F 17/30873* (2013.01)

(58) Field of Classification Search
USPC ........................... 709/203, 223, 224; 715/805
See application file for complete search history.

(56) References Cited

U.S. PATENT DOCUMENTS

| | | | | |
|---|---|---|---|---|
| 5,496,177 A * | 3/1996 | Collia et al. | ................... | 434/118 |
| 5,806,077 A * | 9/1998 | Wecker | ........................ | 715/236 |
| 6,877,007 B1 | 4/2005 | Hentzel et al. | | |
| 6,934,748 B1 * | 8/2005 | Louviere et al. | ............. | 709/224 |
| 7,254,582 B2 * | 8/2007 | Song et al. | .................... | 707/102 |
| 7,418,409 B1 * | 8/2008 | Goel | .............................. | 705/26 |
| 2001/0049635 A1 * | 12/2001 | Chung | ........................... | 705/26 |
| 2002/0065714 A1 * | 5/2002 | Goodwin, III | .................. | 705/26 |
| 2002/0070976 A1 * | 6/2002 | Tanner et al. | ................ | 345/810 |
| 2002/0118220 A1 * | 8/2002 | Lui et al. | ........................ | 345/709 |
| 2002/0156917 A1 * | 10/2002 | Nye | ............................... | 709/238 |
| 2002/0194081 A1 * | 12/2002 | Perkowski | ...................... | 705/26 |
| 2003/0016253 A1 * | 1/2003 | Aoki et al. | ..................... | 345/863 |
| 2003/0023715 A1 * | 1/2003 | Reiner et al. | ................. | 709/224 |
| 2003/0074635 A1 * | 4/2003 | Cao | ................................ | 715/513 |
| 2003/0097277 A1 * | 5/2003 | Miller | .............................. | 705/2 |
| 2005/0044139 A1 | 2/2005 | Christian et al. | | |
| 2005/0154718 A1 * | 7/2005 | Payne et al. | ....................... | 707/3 |
| 2006/0015614 A1 | 1/2006 | Johnson et al. | | |
| 2006/0064411 A1 * | 3/2006 | Gross et al. | ....................... | 707/3 |
| 2008/0086559 A1 * | 4/2008 | Davis et al. | .................... | 709/224 |

OTHER PUBLICATIONS

Advanced Graphics and Web Page Design (Laura Lemay's Web Workshop) by James L. Mohler (Author), Jon M. Duff (Author), Laura Lemay (Editor), Sams Publishing; Pap/Cdr edition (Sep. 1997). ISBN-10: 1575213176, ISBN-13: 978-1575213170, pp. 1-37 as numbered by examiner. www.ssuet.edu.pk/taimoor/books/1-57521-125-4/index.htm.*

Graphics and Web Page Design (Laura Lemay's Web Workshop) by James L. Mohler (Author), Jon M. Duff (Author), Laura Lemay (Editor), Sams Publishing; Pap/Cdr edition (Sep. 1997). ISBN-10: 1575213176, ISBN-13: 978-1575213170, pp. 1-37 as numbered by examiner. www.ssuet.edu.pk/taimoor/books/1-57521-125-4/index.htm.*

* cited by examiner

*Primary Examiner* — John MacIlwinen
(74) *Attorney, Agent, or Firm* — Greenberg Traurig, LLP (57) ABSTRACT

A system determines if functionality offered via a Web site is being underutilizing by a user, e.g., not being using at all or not being using with some desired degree of regularity. When it is determined that the functionality offered via the Web site is being underutilized by the user, the system provides to content of the Web site a cue, e.g., audio and/or visual, for directing the attention of the user to the functionality offered via the Web site.

8 Claims, 7 Drawing Sheets

SYSTEM AND METHOD FOR DIRECTING ATTENTION TO WEB SITE FUNCTIONALITY

BACKGROUND

The following relates generally to e-commerce and, more particularly, relates to a system and method for directing the attention of a user to functionality offered via a Web site.

In the art it is known to monitor interactions of a user with a Web site. For example, U.S. Pat. No. 6,877,007, which is incorporated herein by reference in its entirety, describes a system and method that tracks interaction of a user with content provided by a Web site. To this end, input made by a user as the user interacts with Web page(s) that comprise the Web site, such as mouse movements, button clicks, typing, etc., is streamed back to a tracking server and stored. The stored information related to the user's interactions with the Web site may then be analyzed and used, for example, to redesign the Web site so as to make it more user friendly or more easily navigable.

Published U.S. Application No. 2005/0044139, which is incorporated herein by reference in its entirety, also describes a system and method in which interactions of a user with a Web site are monitored by keeping logs of clicks on Web page links. For this purpose, a Web page developer includes a link identifier in a selectable link of a Web page. When the selectable link is clicked on by a client, the link identifier triggers a click tracking system to initiate click tracking for that particular link. The click on the link is then logged by a tracking server and the client is redirected to a destination specified in the link. Usage patterns may then be derived from statistics generated from the log files on the tracking server.

Published U.S. Application No. 2006/0015614, incorporated herein by reference, additionally describes a system and method which monitors interactions of a user with a Web site by tracking clicks for the purpose of administering Web site referral fees.

While these and other known methods for monitoring interactions of a user with a Web site have been advantageously used to collect information for a myriad of different purposes, a need still remains for a system and method which utilizes information gained from monitoring interactions of a user with a Web site to advantageously direct the attention of a user to functionality offered via a Web site.

SUMMARY

To address this and other needs, disclosed hereinafter is a system and method that uses information gained from monitoring interactions of user with a Web site to direct the attention of a user to functionality offered via a Web site (e.g., further content, tool(s), user interface element(s), etc. which are individually and collectively referred to as "functionality"). More particularly, the described system and method determines which functionality on a Web site a user is underutilizing, e.g., not using at all or not using with some desired degree of regularity. In the event that it is determined that a user is underutilizing functionality offered by the Web site, the attention of the user may be directed to the functionality using an attention getting device.

By way of example, the attention of the user may be directed to the underutilized functionality by manipulating the appearance of a Web page graphical user interface element (e.g., a link by which the functionality is made accessible). The appearance of the graphical user interface element may be manipulated by blinking the element, by providing the element with one or more of a font, size, color, background, etc. that is different or otherwise stands out from other elements that also appear on the Web page, and/or by captioning the element such as by displaying a pointer to the element, by display a mouse-over window when a pointing device is moved over the element, etc. as needed. Still further, a Web site page may be provided with a displayable field, e.g., a banner advertising field, in which the underutilized functionality and/or its advantages may be called to the attention of a user as needed. Yet further, audio output may accompany a Web site page in which the underutilized functionality and/or its advantages may be called to the attention of a user as needed. It will be appreciated that these examples of visual and audio cues that may be provided to Web site content are not intended to be limiting and that other visual and audio cues may be provided to Web site content for this same purpose.

As will therefore be appreciated, the described system and method has, among others, the advantage of directing the attention of a user to functionality of a Web site that the user may not otherwise be aware is available at the Web site.

While the foregoing generally describes a system and method for directing the attention of a user to functionality offered via a Web site, a better understanding of the objects, advantages, features, properties and relationships of the system and method will be obtained from the following detailed description and accompanying drawings which set forth illustrative embodiments which are indicative of the various ways in which the principles of the invention may be employed.

BRIEF DESCRIPTION OF THE DRAWINGS

For a better understanding of the described system and method for directing the attention of a user to functionality offered via a Web site reference may be had to preferred embodiments shown in the following drawings in which.

DETAILED DESCRIPTION

Figure 1:
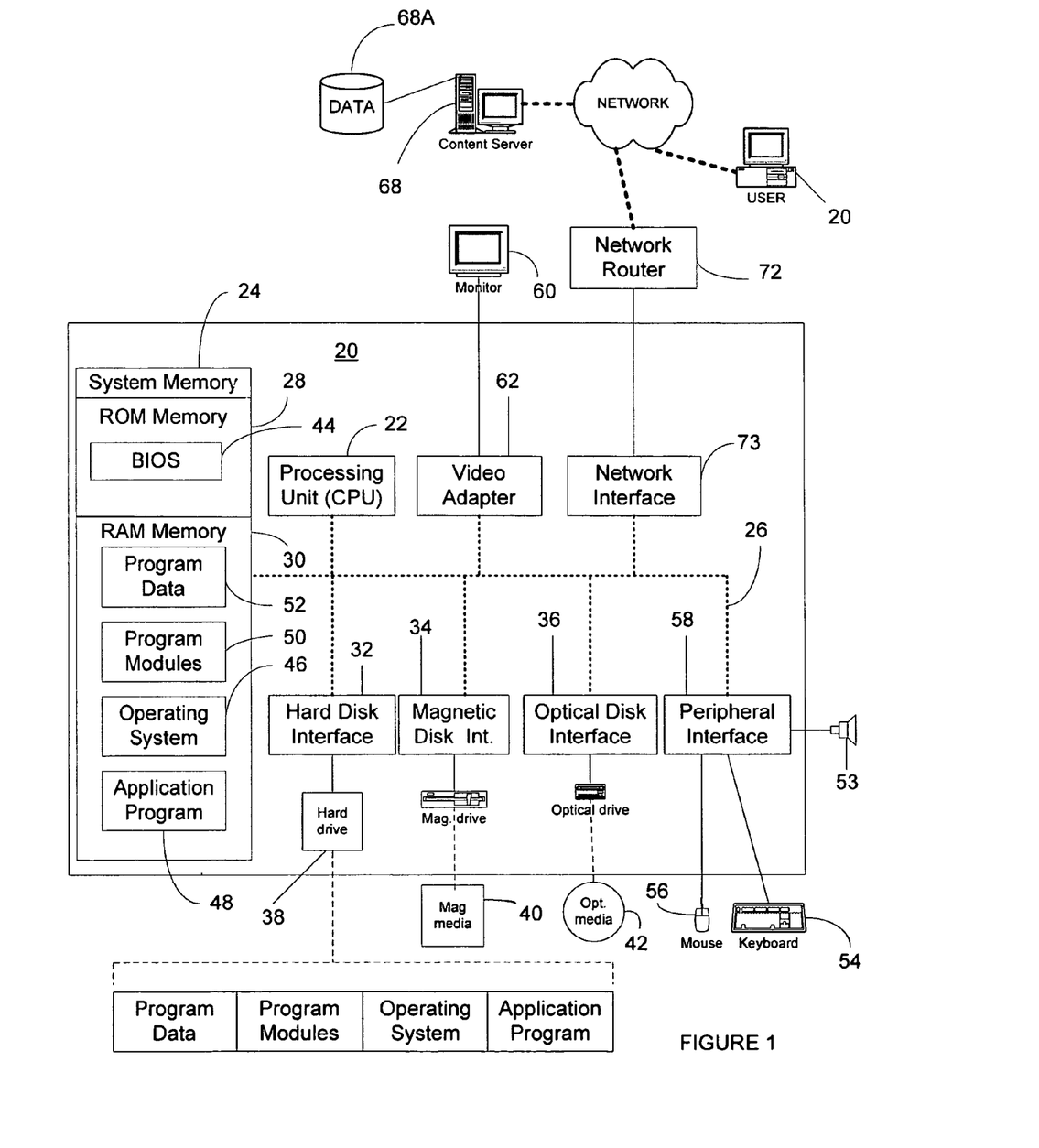
FIG. 1 is a diagram illustrating an exemplary system for directing the attention of a user to functionality offered via a Web site.

The following describes, with reference to the drawings, an exemplary system for monitoring interactions of a user with a Web site for the purpose of directing the attention of a user to functionality offered via the Web site. As illustrated in FIG. 1, the system will be described in the context of a plurality of processing devices linked via a network, such as the World Wide Web or the Internet. In this regard, a client processing device 20, illustrated in the exemplary form of a computer system, provides a means for a user to access a Web site content server 68 via the network and thereby gain access to content, such as media, data, Web pages, an electronic catalog, etc., stored in a repository 68A associated with the content server 68. Furthermore, the Web site content server 68 and/or the client device 20 includes functionality which allows the system to monitor how a user interacts with the Web site content offered via the Web site content server 68. Information relevant to how the user interacts with the content offered by the Web site content server 68 may be stored and then used to dynamically modify the content for the purpose of directing the attention of a user to functionality offered via the Web site. The information relevant to how the user interacts with the content offered by the Web site may be stored in the repository 68A associated with the content server 68 and may be further indexed to a particular user (e.g., using their log-in information or other information which the content server 68 may use to recognize the user) and/or one or more groups of users having one or more demographics deemed to be similar to a recognized user being monitored, e.g., from the same region, income level, profession, etc. The information relevant to how the user interacts with the content offered by the Web site may also be stored on the client computing device 20 of a user, for example in cases where a user has not logged onto the Web site content server 68 and is anonymously navigating the content provided by the Web site content server 68. In this case, the information relevant to how a user interacts with the content offered by the Web site content server 68 may be stored in, for example, a cookie placed onto the client computing device 20 using well known techniques. Since the manner by which the client device 20 is used to access and navigate the Web site offered by the Web site content server 68, the manner by which the Web site content server 68 makes content available to the client device 20, and the manner by which the Web site usage is monitored are all well known in the art, they will not be discussed herein for the sake of brevity.

For performing the functions required of the computing devices 20 and 68, the computing devices include computer executable instructions that reside in program modules which may include routines, programs, objects, components, data structures, etc. that perform particular tasks or implement particular abstract data types. Accordingly, those skilled in the art will appreciate that the computing devices may be embodied in any device having the ability to execute instructions such as, by way of example, a personal computer, mainframe computer, personal-digital assistant ("PDA"), cellular telephone, or the like. Furthermore, while the computing devices within the system are illustrated as respective single devices, those skilled in the art will also appreciate that the various tasks described hereinafter may be practiced in a distributed environment having multiple processing devices linked via a local or wide-area network whereby the executable instructions may be associated with and/or executed by one or more of multiple processing devices.

More particularly, considering client computing device 20, which is also representative of all of the computing devices illustrated in FIG. 1, for performing the various tasks in accordance with the executable instructions, the client computing device 20 preferably include one or more processing units 22 and a system memory 24 which may be linked via a bus 26. Without limitation, the bus 26 may be a memory bus, a peripheral bus, and/or a local bus using any of a variety of well known bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a removable magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the client computing device 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the client computing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example, via a network connection.

A user may enter commands and information into the client computing device 20 through input devices such as a keyboard 54 and/or a pointing device 56. While not illustrated, other input devices may include a microphone, a joystick, a game pad, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, universal serial bus (USB), or the like. To receive information from the client computing device 20, a monitor 60 or other type of display device may also be connected to the bus 26 via an interface, such as a video adapter 62. In addition to the monitor 60, the client computing device 20 may also include other peripheral output devices such as a speaker 53.

As further illustrated in FIG. 1, the client computing device 20 has logical connections to one or more remote computing devices, such as the content server 68 which, as noted above, may include many or all of the elements described above relative to the client computing device 20 as needed for performing its assigned tasks. Communications between the client computing device 20 and the content server 68 may be exchanged via a further processing device, such as network router 72, that is responsible for network routing. Communications with the network router 72 may be performed via a network interface component 73.

As discussed above, for the purpose of directing the attention of a user to functionality offered via the Web site, the system functions to monitor interactions of one or more users with content that comprises the Web site. In this regard, the system may monitor one or more of the following without limitation: locations to which a mouse is moved within displayed content; links to content that are being activated; a time during which Web pages or other content is being viewed or accessed; search requests being entered by a user; etc. The information gathered from the Web site usage monitoring may then be used to supplement the content being offered by the server with audio or visual cues that will function to direct the attention of the user to functionality that is, for example, considered to be underutilized by a particular user or group of users of which a particular user is a member (individually and collectively referred to as "user"). The information gathered from the Web site usage monitoring may also be used to automatically take the user directly to the functionality that is being underutilized.

Figure 2:
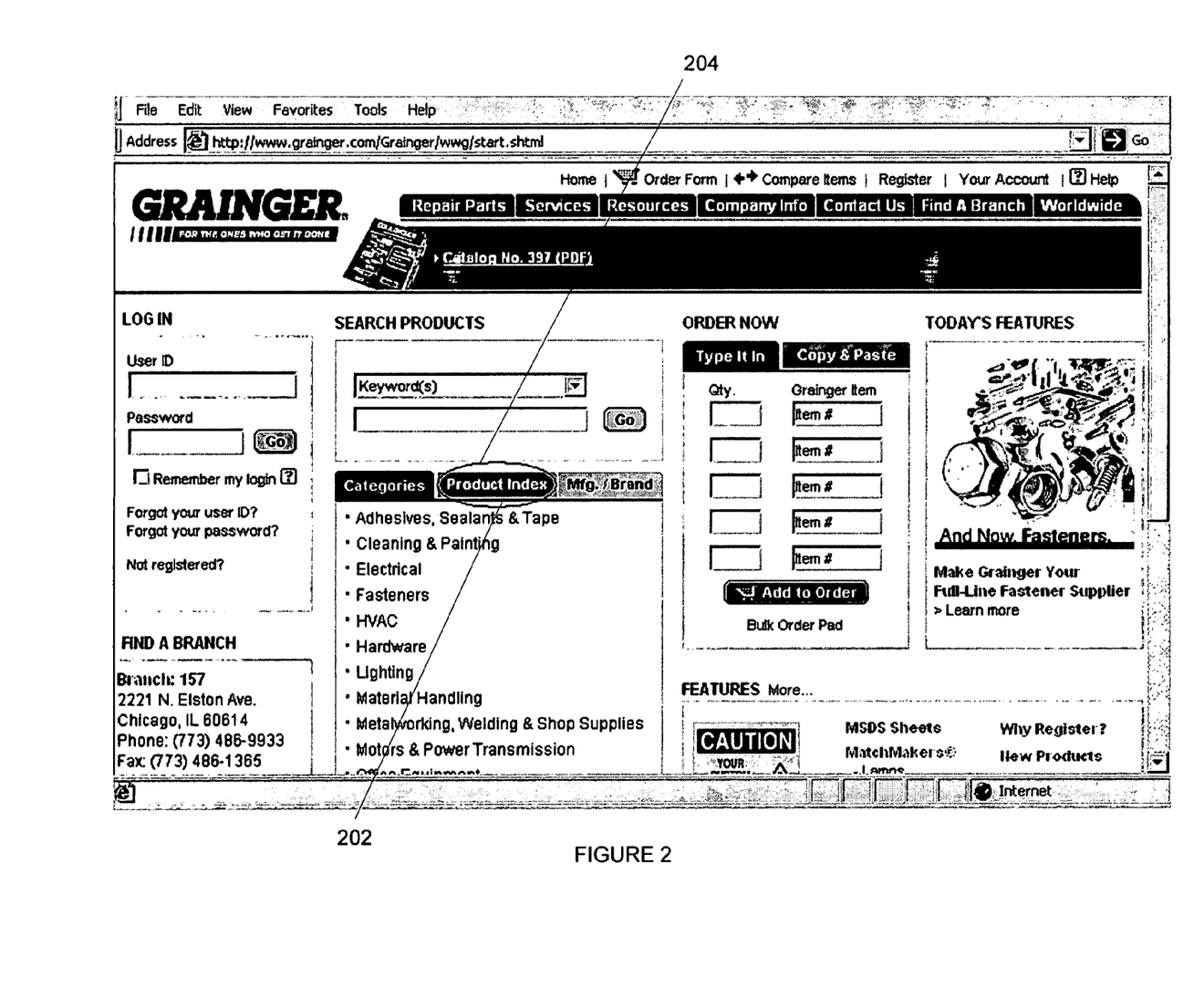
FIGS. 2-7 are screen shots illustrating exemplary methods of providing cues to Web site content which serve to direct the attention of a user to functionality offered via a Web site.
Figure 3:
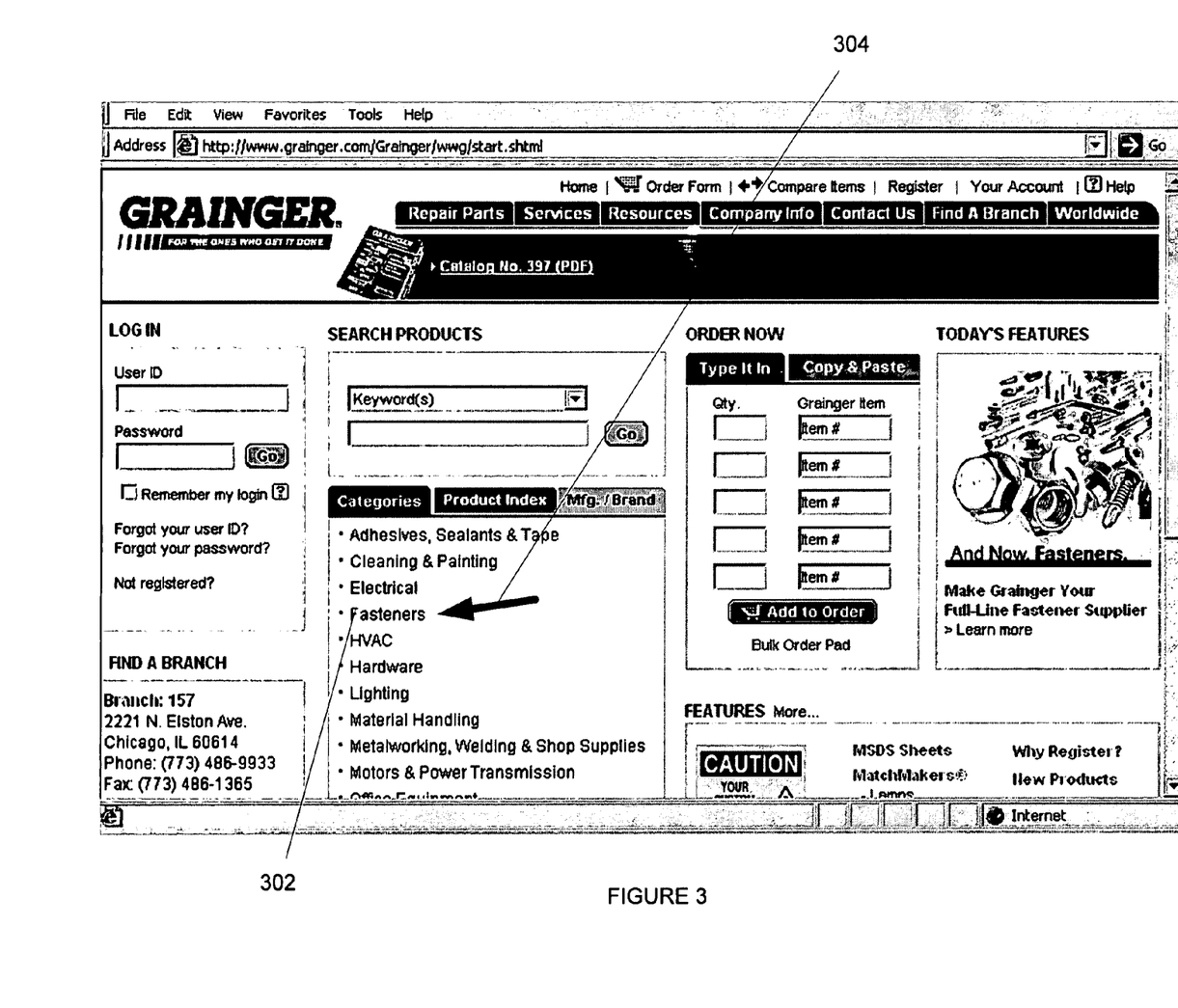
Figure 4:
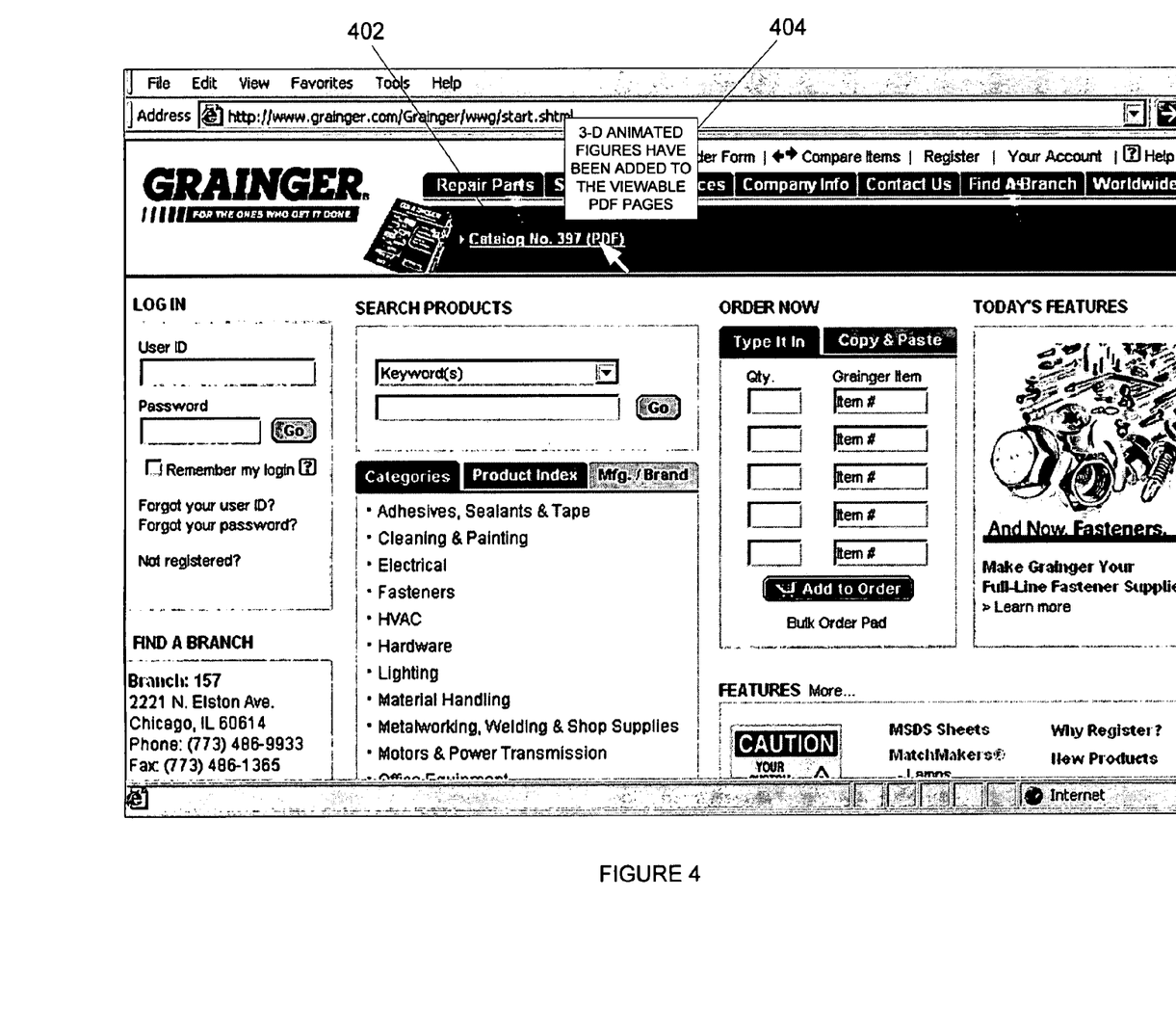
Figure 5:
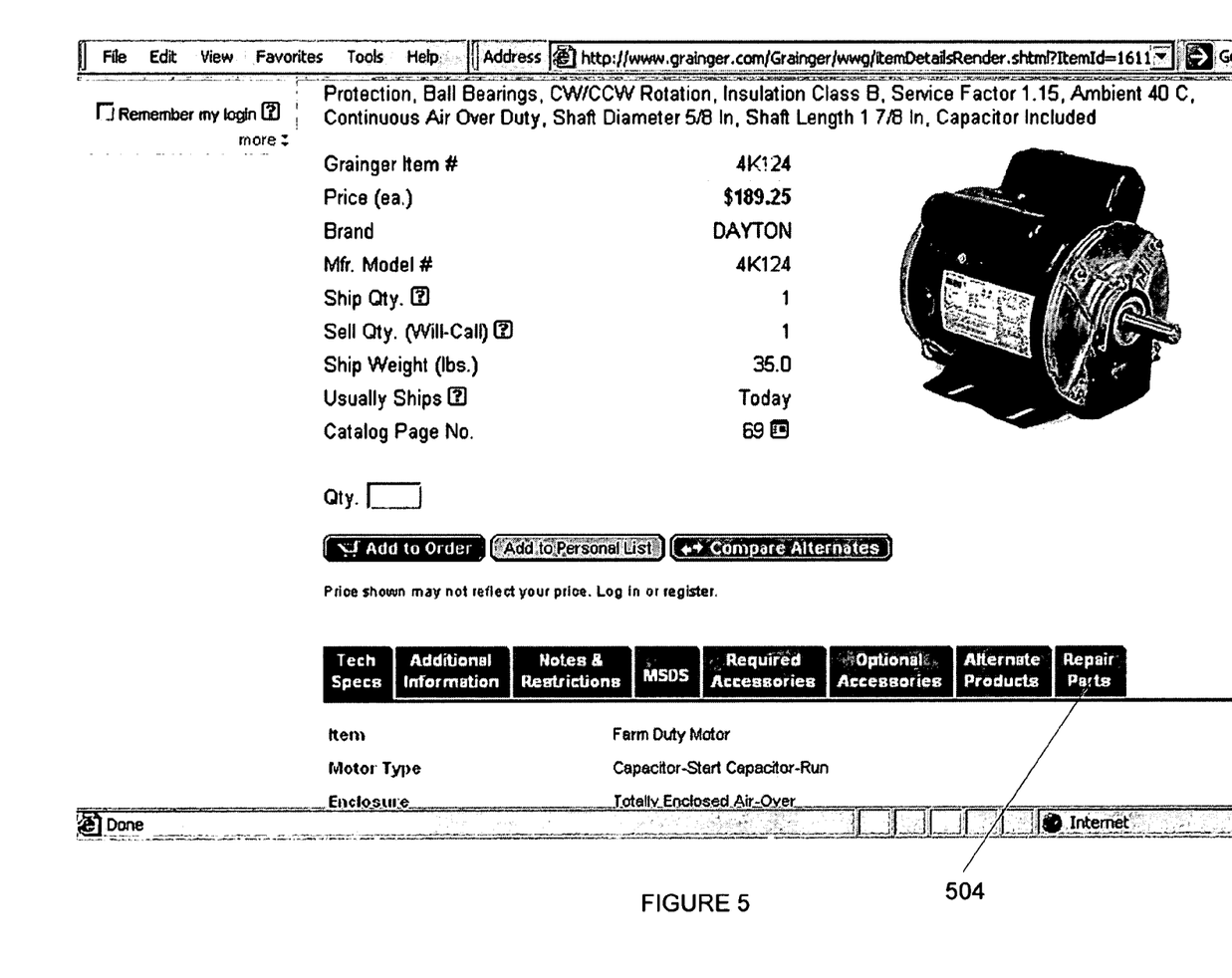

By way of example with reference to FIG. 2, by monitoring interactions of a user with the Web site, e.g., by performing classical click-stream analysis, it may be determined that the user is underutilizing the "product index" functionality offered by the Web site, e.g., the user has never clicked on the "product index" graphical user interface element 202, has not clicked on the "product index" graphical user interface element 202 within a given number of Web site (or Web page) accesses, has not clicked on the "product index" graphical user interface element 202 within a given number of clicks on other graphical user interface elements, has not clicked on the "product index" graphical user interface element 202 within a given period of time, etc. In response to this determined underutilization of the "product index" functionality, the content of the Web site, e.g., the Web page illustrated in FIG. 2, may be supplemented with an audio or visual cue to call the attention of the user to the "product index" graphical user interface element 202 and, accordingly, the functionality that will be made available to the user should the user click upon the "product index" graphical user interface element 202. In the example illustrated in FIG. 2, a visual cue, in the form of an element 204, e.g., an image, that encircles the "product index" graphical user interface element 202 is provided to the content, i.e., displayed in the content, to call the attention of the user to the underutilized functionality. In the example illustrated in FIG. 3, a visual cue in the form of an element 304 that may flash adjacent to and which points to a graphical user interface element, e.g., the "fasteners" graphical user interface element 302, is provided to the content to call the attention of the user to the underutilized functionality associated with the graphical user interface element 302. In the example illustrated in FIG. 4, a visual cue in the form of a pop-up element 404 that appears when a pointing device is moved over a graphical user interface element, e.g., the "catalog no. 397 (pdf)" graphical user interface element 402, is provided to the content to call the attention of the user to the underutilized functionality associated with the graphical user interface element 402. In the example illustrated in FIG. 5, an audio cue in the form on an announcement that is to be emitted from speaker 53 upon access to the illustrated Web page, e.g., an audio segment which states "repair parts are available by clicking upon the repair parts tab," is provided to the content to call the attention of the user to an underutilized functionality, e.g., the functionality that is available upon the user clicking the "repair parts" graphical user interface element 504. It will be appreciated that these illustrated visual and audio cues are not intended to be limiting and that other visual and/or audio cues may be provided to content to serve the same purpose.

Figure 6:
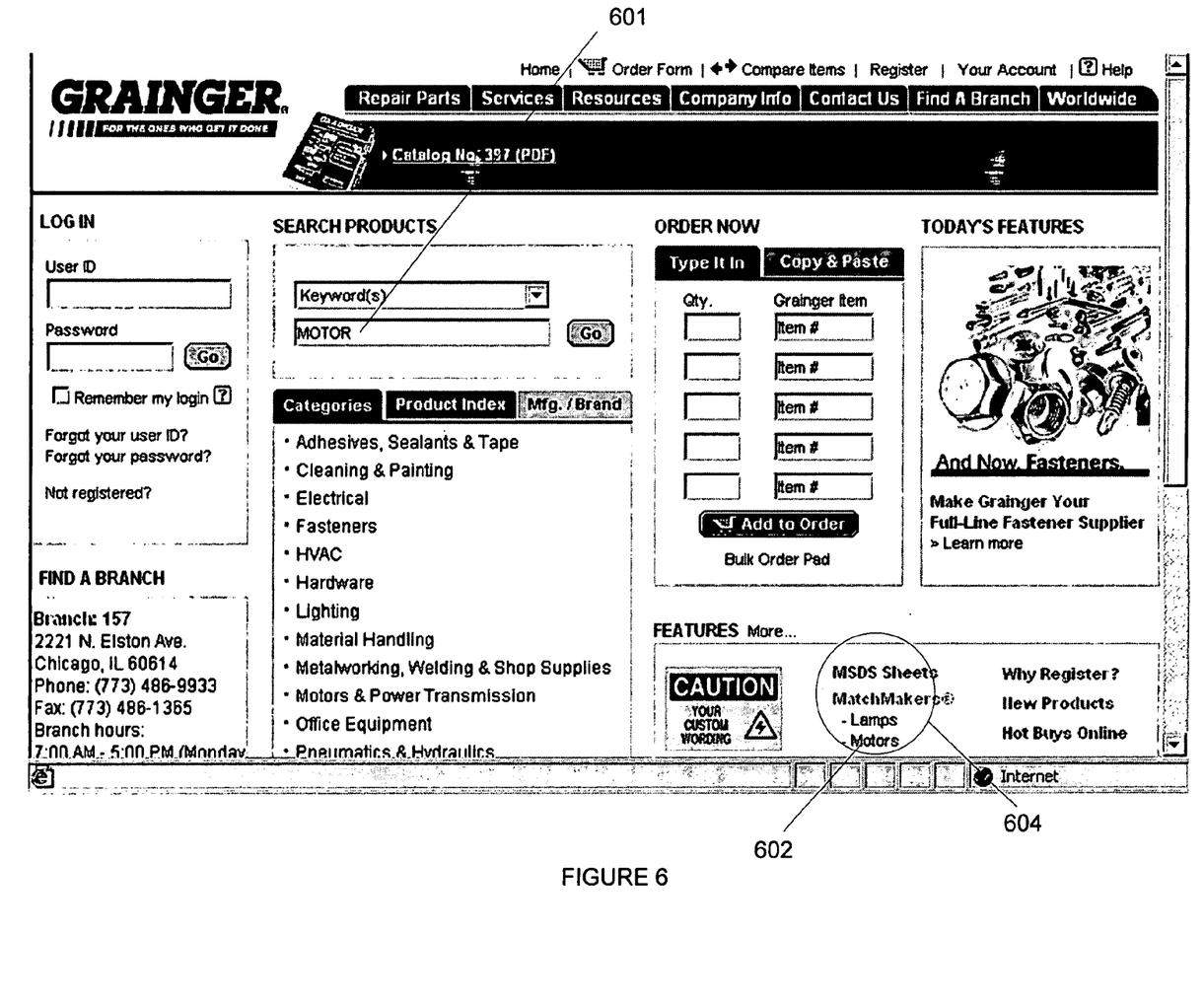

The system may also function to monitor interactions of a user with a Web site while also considering the contextual relevance of the usage to functionality offered via the Web site. By way of example only, the system may consider the contextual relevance of search terms entered by a user as the user interacts with the Web site. In this manner, the system may determine based upon repeated usage of a search term (such as "motor") and monitored non-usage of Web site offered functionality that is contextually related to the search term (such as the "MotorMatch" brand functionality which provides a selection guide for finding motors), that functionality that is contextually related to a search term that is being repeatedly used by a user should be called to the attention of that user. Accordingly, as illustrated in FIG. 6, by monitoring usage of the search field 601 and usage of the graphical user interface elements, particularly graphical user interface element 602 which, when activated, launches the "MotorMatch" brand selection guide, the system can determine if a user is repeatedly searching for motors using keywords while not taking advantage of a tool which is provided specifically for the purpose of making it easier to find motors. Based upon this determination, the system may then provide a visual or audio cue, e.g., cue 604, to the content of the Web site to thereby direct the user to the underutilized functionality, e.g., a graphical user interface element 602 that may be activated to instantiate the underutilized functionality. In this example, the cue 604 can be provided to the content the next time the user access the Web page after the user has used the keyword "motor" a predetermined number of times without an intervening usage of the functionality provided by the "MotorMatch" brand tool.

Figure 7:
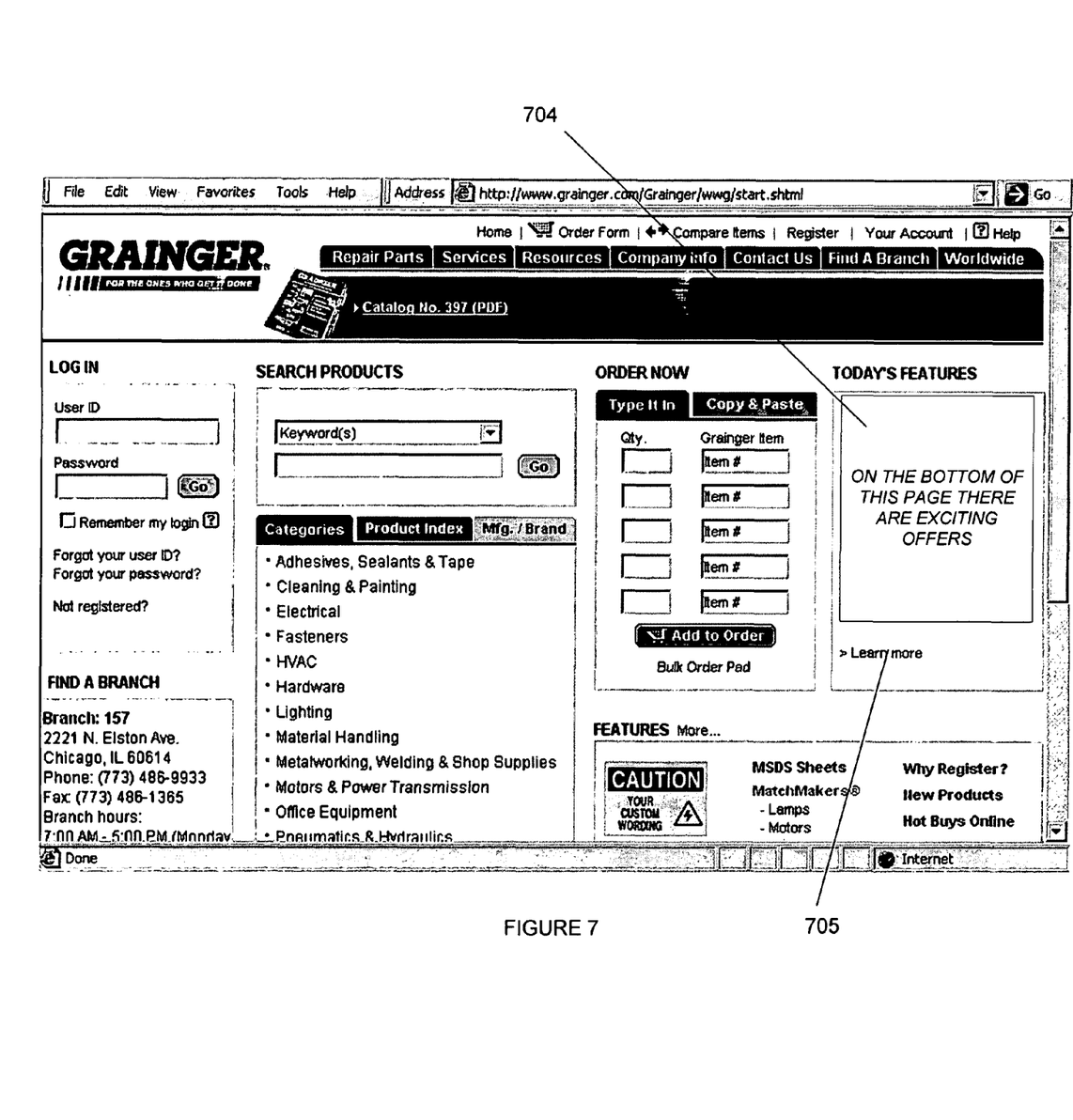

The system may additionally function to monitor interactions of a user with the Web site to determine if a user is navigating within or to particular content locations. For example, the system may determine whether the user is clicking on graphical user interface elements that are found at a particular location within the content, e.g., at the bottom of Web page, whether the user is using a scroll bar to view a particular location within the content, e.g., using the scroll bar to display the bottom of a Web page, whether the user has moved a mouse within a particular area of content, etc. Accordingly, as illustrated in FIG. 7, by monitoring location indicative usage of the content, the system can determine that the attention of a user might need to be drawn to functionality that might be found in the underutilized areas of the content. Based upon this determination, the system may then provide a visual or audio cue to the content, e.g., cue 704, to thereby direct the user to the underutilized functionality. In this example, the cue 704 is in the form of an advertising banner that is intended to direct the attention of the user to the underutilized content. As will also be appreciated, the advertising banner cue 704 may also be provided with an accompanying link 705 which, when actuated, will automatically cause the user to be moved to the content (whether within a given Web page, to another Web page, etc.) to thereby expose to the user the functionality it is desired that the user see.

When the system determines that a visual and/or audio cue is desired to be provided to the content to thereby call the attention of a user to functionality made available via the Web site, the visual and/or audio cue may be presented to the user for one or more of a predetermined number of accesses to the Web site (or Web page), a predetermined period of time, and/or until the user interacts with the functionality, etc.

It will also be appreciated that the cue may take the form of an automatic launching of the functionality that is being underutilized. By way of example only, the attention of a user may be drawn to the underutilized "MotorMatch" brand tool by the system automatically launching the "MotorMatch" brand tool in response to the user using the search term "motor" a predetermined number of times without an access to the "MotorMatch" brand tool. Similarly, the system may draw the attention of a user to underutilized functionality by automatically taking the user to particular content of the Web site associated with the underutilized functionality when certain monitored conditions have been met, e.g., the system may move the displayed content to focus on the "MotorMatch" brand tool link, may move the user's mouse cursor to the "MotorMatch" brand tool link, etc.

To provide the visual or audio cues to a user, standard Web page design techniques may be employed. For example, since standard HTML allows for the modification of visual characteristics of textual information, the attention of a user may be drawn to a particular functionality by adding attention-getting text next to or near to the functionality as noted above. Furthermore, since standard HTML allows for the changing of font size, font colors, font types, etc., of Web page textual elements, those of ordinary skill in the art will readily appreciate how to provide attention-getting text with one or more characteristics that will be distinct from the characteristics of nearby Web page elements. Likewise, those of ordinary skill in the art will readily appreciate how to use standard HTML programming techniques to similarly modify the font size, font color, font type, etc. of a link to functionality to thereby provide the link with one or more characteristics that will be distinct from the characteristics of other Web page elements. In this regard, it will be understood that providing unique treatment to a link in a grouping of links will make that particular link (and its associated functionality) stand out.

Yet further, since standard HTML provides the ability to include images within Web pages, the attention of a user may be drawn to a particular functionality by adding an attention-getting image next to or near to the functionality as was also noted above. The attention getting image may also serve as a direct link to the functionality. To draw the attention of a user to an image, those of ordinary skill will appreciate that there are numerous standard techniques that can be used. For example, a Web page may be provided with an image that functions to disrupt the common theme or look-and-feel of a given webpage whereupon this disruption functions to gain the attention of the user, an image may be used that has a substantially different color when compared to other colors of a Web page or from the other colors in a particular area of a Web page, an image may be caused to blink, an image may be provided with a unique shape, etc. It will also be understood by those of ordinary skill that the attention of a user may be drawn to an image and hence functionality associated with the image by animating the image using, for example, standard GIF technology. It will be additionally understood by those of ordinary skill that a browser plug-in or the like, e.g., using Macromedia Flash Player, Ajax, etc., may also be used to provide the attention getting image or animation. For example, the browser plug-in can be programmed to cause a particular text link, image link, or area of the webpage to be encircled to thereby draw attention to functionality. The encircling element can have its color and appearance designed to maximize its ability to draw attention to that area of the webpage. Browser plug-in technology might also be utilized to, for example, provide an animation device that might appear on one part of the Web page and move to another part of the Web page to direct a user to functionality in or near the area to which the moving animation device is directed.

Since HTML also allows Web pages to be provided with audio, e.g., WAV files, those of ordinary skill in the art will appreciated how to include audio cues to a Web page for the purpose of playing a message for the user to hear, for example when the Web page is loaded into the users computer. As discussed above, these audio segments can contain verbal information which inform the user to what area of the Web page, i.e., what functionality, the user might want to pay particular attention to.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is being claimed is:

1. A computer-readable media embodied in a non-transitory physical memory device having stored thereon instructions executable by a computer for directing attention of a user to a particular functionality offered via a Web site, the instructions performing steps comprising:
    monitoring interactions of a user with functionality of the Web site;
    actively determining from the monitored interactions if a pre-existing link of a Web page used to access the particular functionality offered via the Web site has been activated within a predetermined number of accesses to the Web site; and
    when it is determined from the monitored interactions that the pre-existing link of the Web page used to access the particular functionality offered via the Web site has not been activated within a predetermined number of access to the Web site, actively causing an alteration in an appearance of the pro-existing link of the Web page as it is displayed in the Web page.

2. The computer-readable media as recited in claim 1, wherein the appearance of the pre-existing link of the Web page is altered for a predetermined period of time.

3. The computer-readable media as recited in claim 1, wherein the appearance of the pre-existing link of the Web page is altered for a predetermined number of access by the user to the Web site.

4. The computer-readable media as recited in claim 1, wherein the particular functionality offered via the Web site comprises a selection guide.

5. A computer-readable media embodied in a non-transitory physical memory device having stored thereon instructions executable by a computer for directing attention of a user to a particular functionality offered via a Web site, the instructions performing steps comprising:
    monitoring interactions of a user with functionality of the Web site;
    actively determining from the monitored interactions if a pre-existing link of a Web page used to access the particular functionality offered via the Web site has been activated within a predetermined number of accesses to the Web site; and
    when it is determined from the monitored interactions that the pre-existing link of the Web page used to access the particular functionality offered via the Web site has not been activated within a predetermined number of access to the Web site, actively causing a pointer to be displayed on the Web page that points to the pre-existing link of the Web page as it is displayed in the Web page.

6. The computer-readable media as recited in claim 5, wherein the pointer is displayed on the Web page for a predetermined period of time.

7. The computer-readable media as recited in claim 5, wherein the pointer is displayed on the Web page for a predetermined number of accesses by the user to the Web site.

8. The computer-readable media as recited in claim 5, wherein the particular functionality offered via the Web site comprises a selection guide.

* * * * *